Oct. 31, 1933.  W. W. TWOMEY  1,933,488
JACK
Filed Oct. 31, 1932   2 Sheets-Sheet 1

Inventor
W. W. Twomey,

By Clarence A. O'Brien
Attorney

Oct. 31, 1933.  W. W. TWOMEY  1,933,488
JACK
Filed Oct. 31, 1932   2 Sheets-Sheet 2
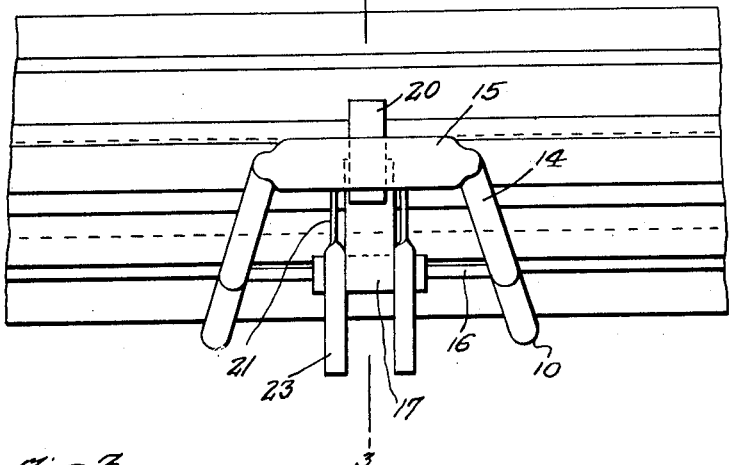
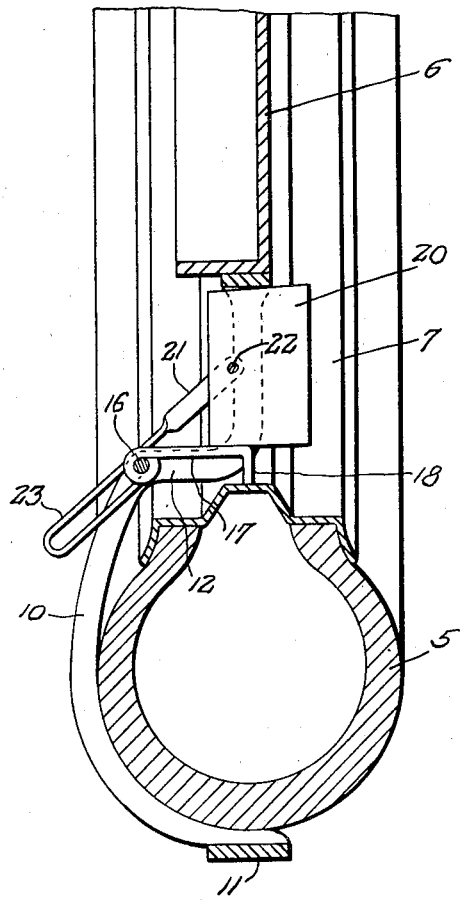
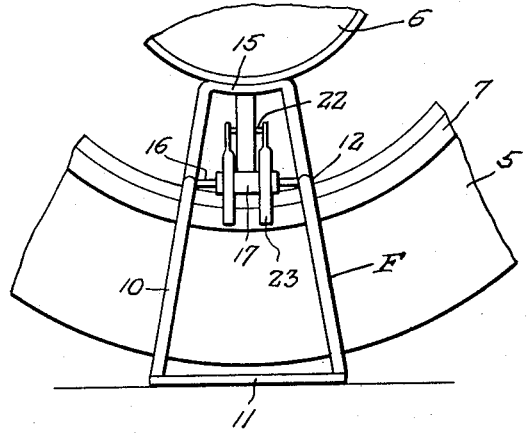
Inventor
W. W. Twomey,
By Clarence A. O'Brien
Attorney Patented Oct. 31, 1933

1,933,488

UNITED STATES PATENT OFFICE 1,933,488

JACK

William W. Twomey, Danville, Ill.

Application October 31, 1932. Serial No. 640,533

2 Claims. (Cl. 254—94)

The present invention relates to a jack designed for use with automobiles in jacking up wheels so that the wheels may be easily and quickly removed.

The objects of the invention are to provide a jack of this nature which is exceedingly simple in construction, easy to manipulate, strong and durable, inexpensive to manufacture, thoroughly efficient and reliable in use and otherwise well adapted to the purpose for which it is designed.

Another very important object of the invention resides in the provision of a jack of this nature having means whereby it is quickly attachable to and detachable from a wheel so that the automobile may be moved a slight distance to run the wheel up on the jack in a jacked up position and then released therefrom so that the wheel may be removed.

With the above and numerous other objects in view as will appear as the description proceeds, the invention consists in certain novel features of construction, and in the combination and arrangement of parts as will be hereinafter more fully described and claimed.

In the drawings:

Figure 2 is a fragmentary plan thereof.

Figure 3 is a sectional view taken substantially on the line 3—3 of Figure 2.

Figure 4 is a fragmentary view similar to Figure 1 showing the wheel jacked up.

Figure 1:
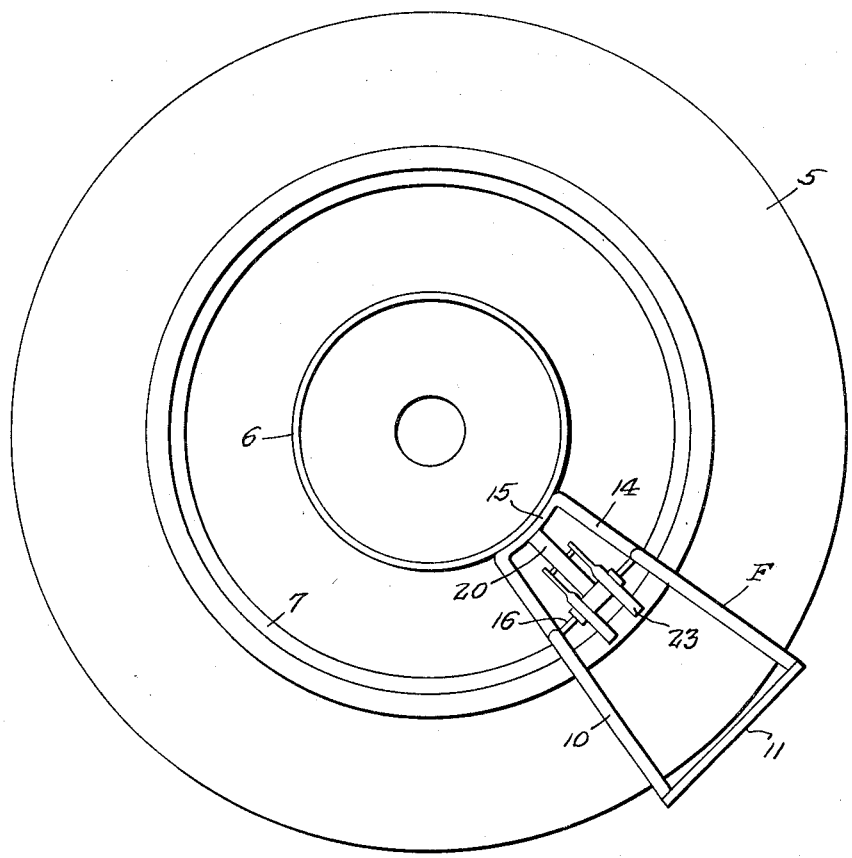
Figure 1 is an elevation of a wheel and a jack assembled.
Figure 5:
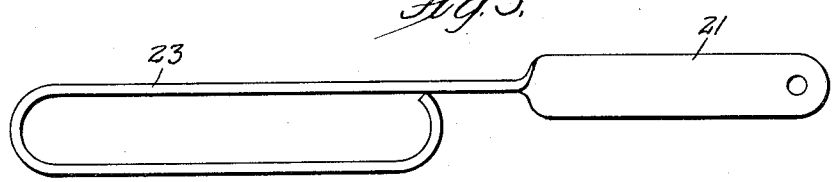
Figure 5 is a detail view of one of the strap levers.
Figure 6:
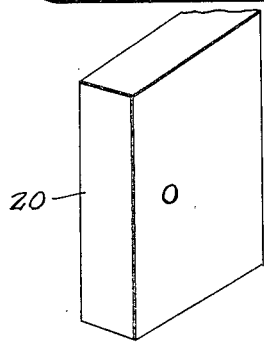
Figure 6 is a perspective view of the wedge block.

Referring to the drawings in detail it will be seen that numeral 5 denotes generally a wheel and numeral 6 denotes the conventional brake drum. Numeral 7 denotes the rim of the wheel. A frame F comprises outer curved arms 10 connected at their lower ends by a foot 11. These arms curve up about the tire and merge into inwardly disposed extensions 12 which in turn merge into inward extensions 14 connected by a curved cross member 15 to abut the brake drum 6. A pin 16 extends between the junctures of the arms 10 with the extensions 12 and has rockable thereon an arm 17 having a laterally disposed end portion 18 to engage the center of the rim 7. A wedge block 20 is disposed between the member 15 and the arm 17 and has a pair of strap levers 21 pivotally engaged therewith as at 22 and formed with elongated loop handles 23 slidable on the pin 16 so that by swinging these strap levers in one direction the wedge block 20 is drawn tightly between the member 15 and the arm 17 to lock the jack to the wheel.

When the jack is locked to the wheel in the position shown in Figure 1 then the automobile is started and moved a slight distance so as to cause the jack to move to the position shown in Figure 4 with the wheel jacked up and then the levers 23 are actuated in the opposite direction sliding the block 20 out of wedging engagement with the member 15 and the arm 17 so that the wheel may be readily removed.

It is thought that the construction, operation, utility and advantages of this invention will now be clearly understood without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a jack structure of the class described, a frame comprising a pair of outer curved arms, a foot piece connecting the outer ends of the arms, the inner ends of the arms merging into lateral extensions which in turn merge into inward extensions, a curved member connecting the ends of the inward extensions, an arm rockably mounted between the lateral extensions and a wedge block adapted to be placed between said arm and the curved member for holding said curved member against a portion of the brake drum of a wheel and a part of the arm against a portion of the rim of the wheel.

2. In a jack structure of the class described, a frame comprising a pair of outer curved arms, a foot piece connecting the outer ends of the arms, the inner ends of the arms merging into lateral extensions which in turn merge into inward extensions, a curved member connecting the ends of the inward extensions, an arm rockably mounted between the lateral extensions, a wedge block adapted to be placed between said arm and the curved member for holding said curved member against a part of the brake drum of a wheel and a portion of the arm against a part of the wheel rim, a pair of slotted arms pivoted to the block and a member carried by the frame and supported by the lateral extensions, passing through the slots of said arms and forming a pivot for the rockably mounted arms.

WILLIAM W. TWOMEY.